UNITED STATES PATENT OFFICE.

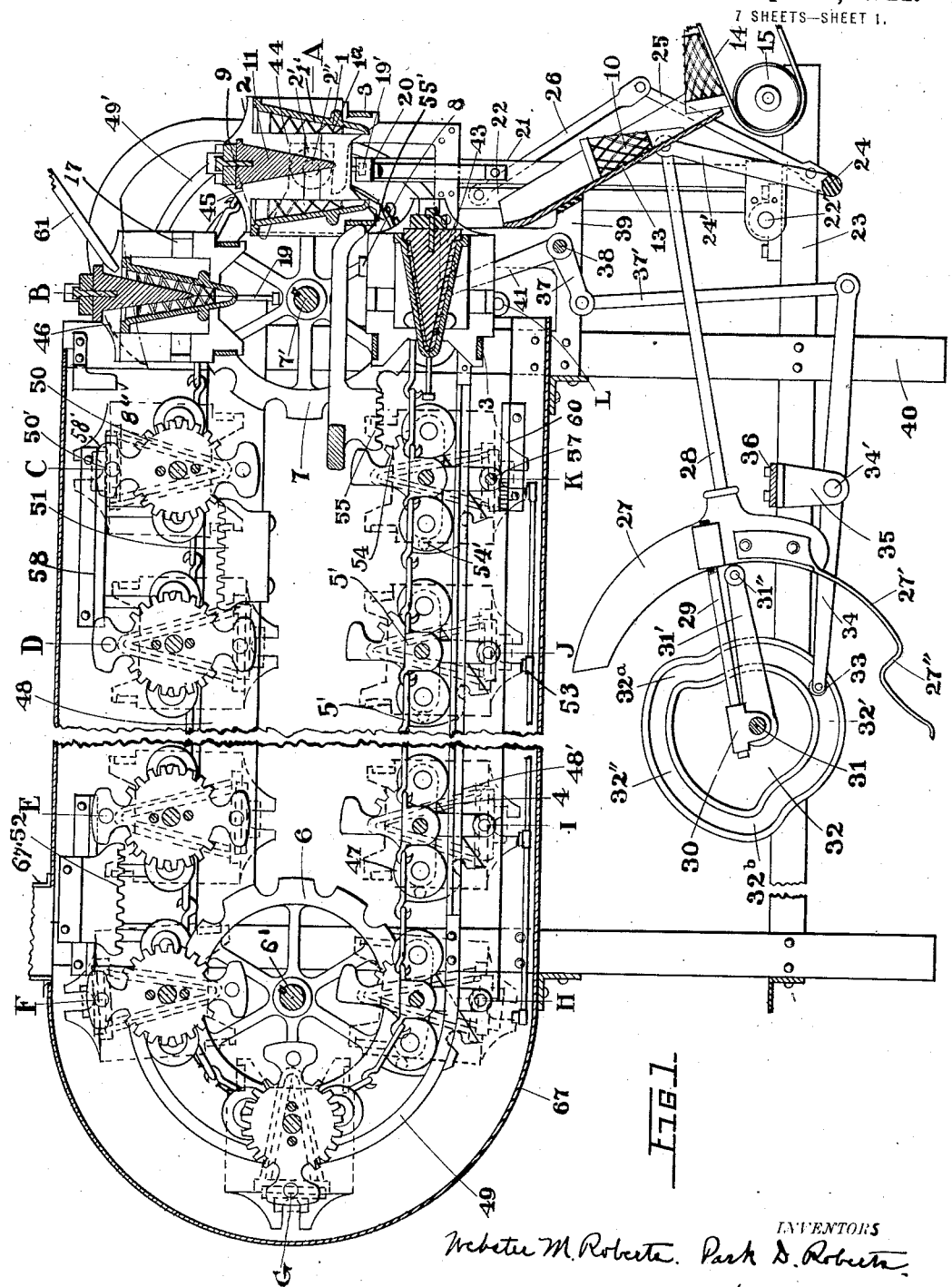

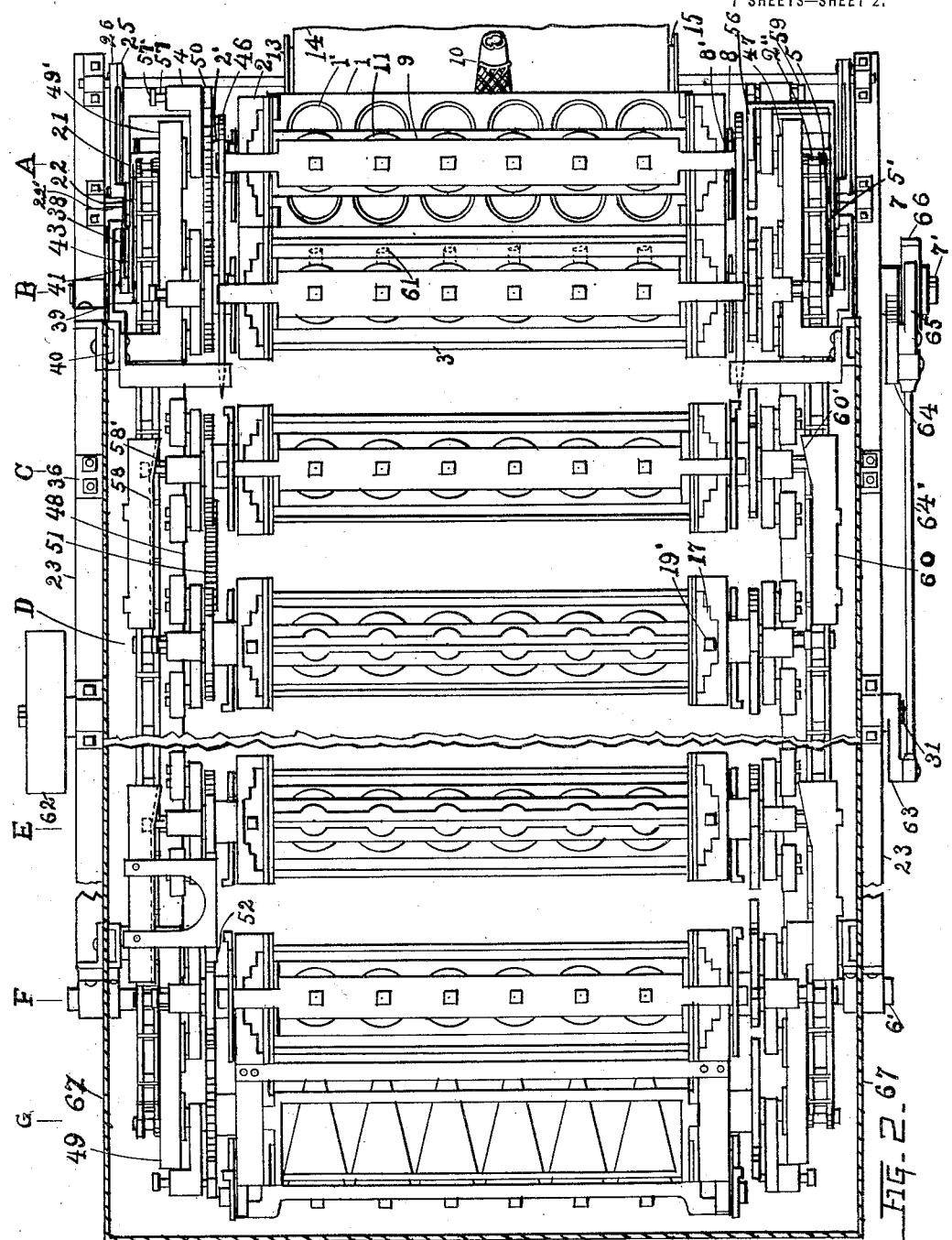

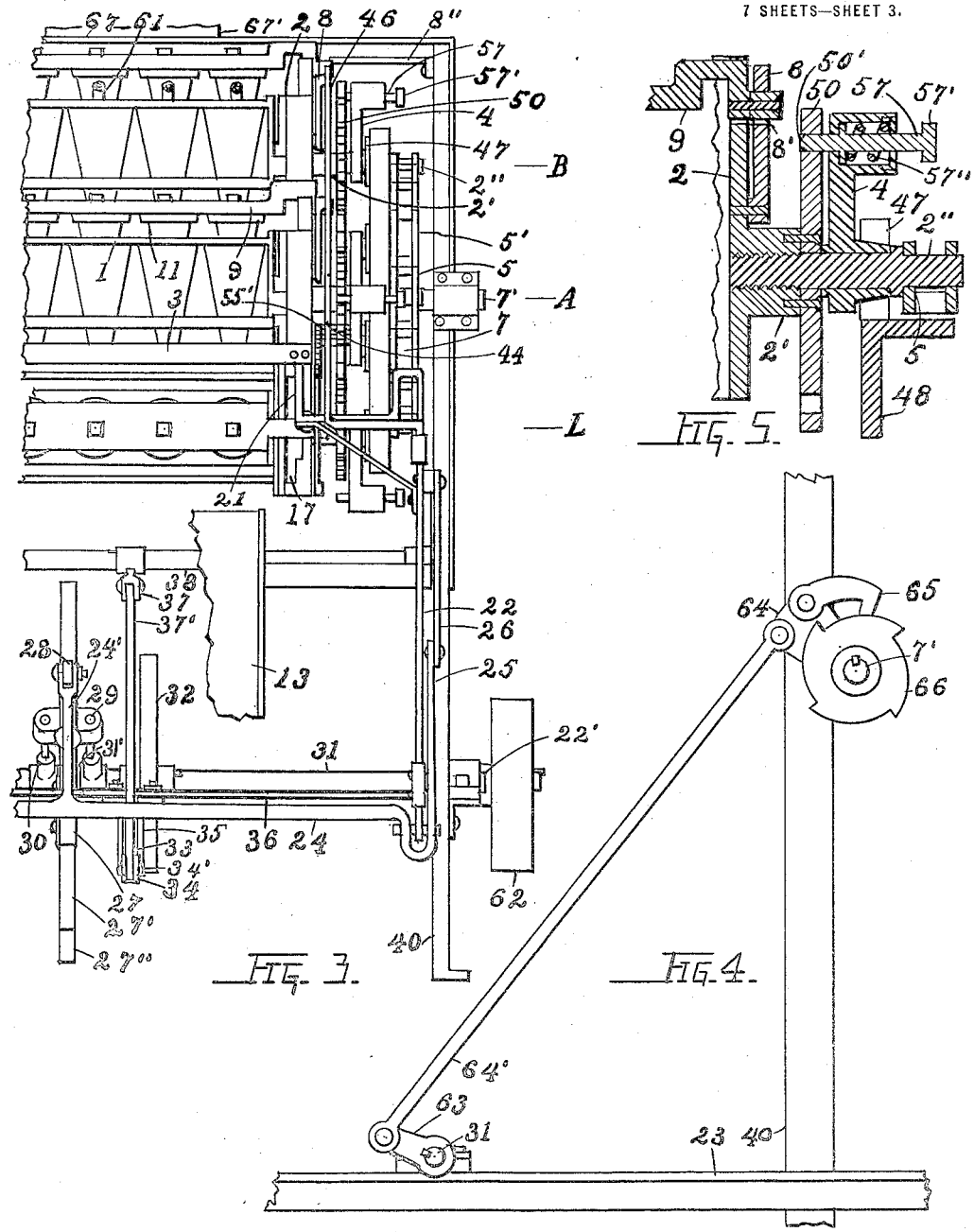

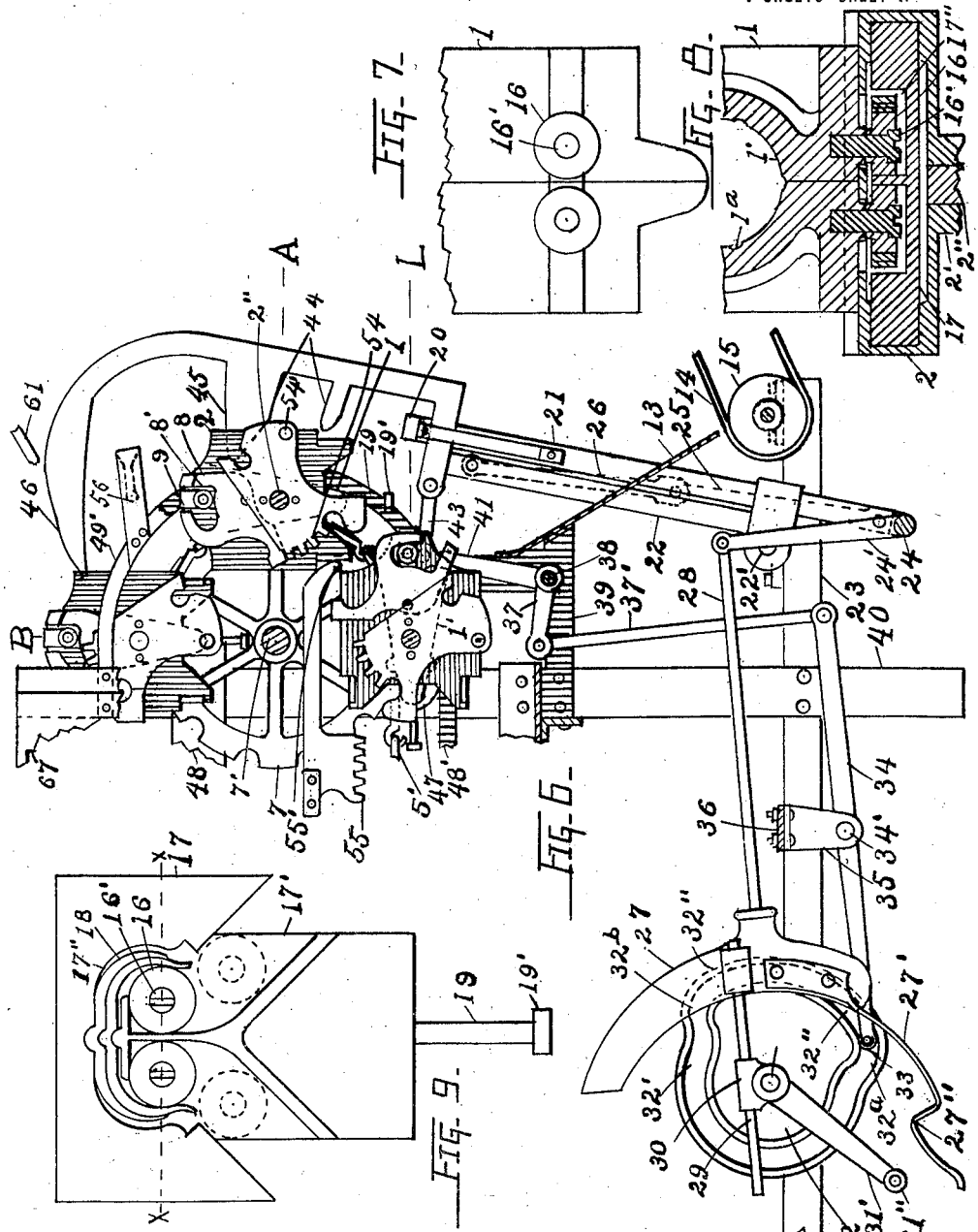

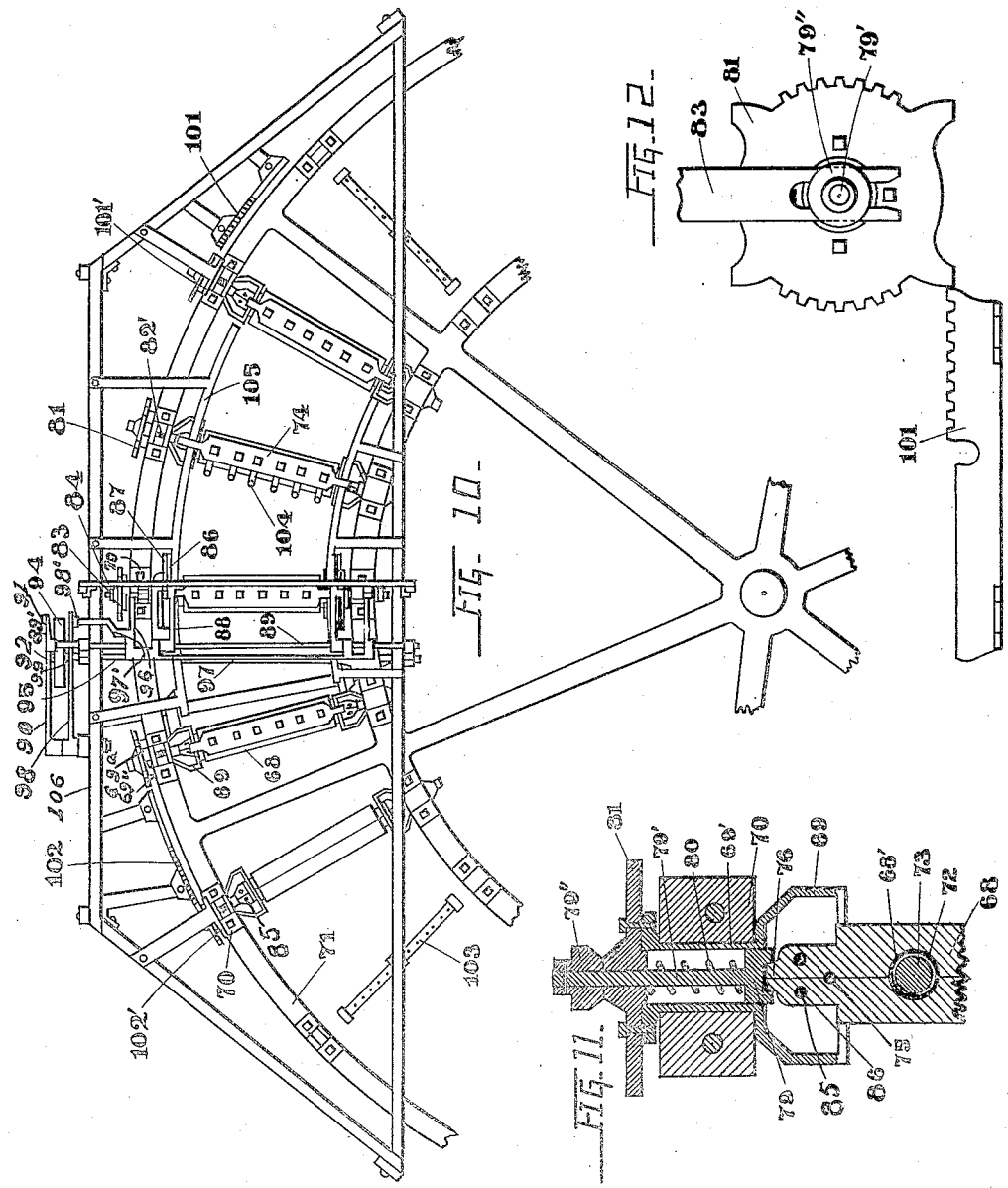

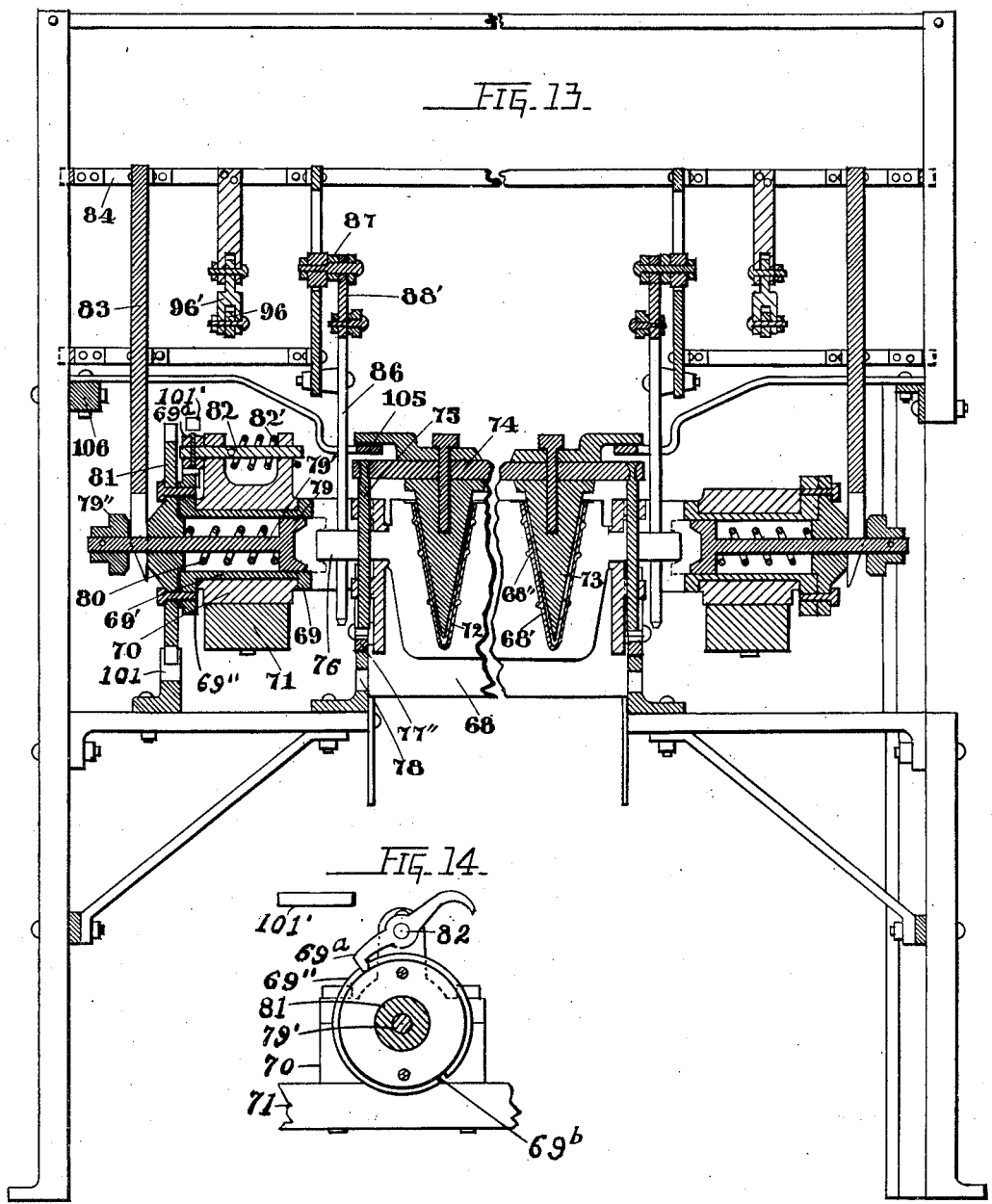

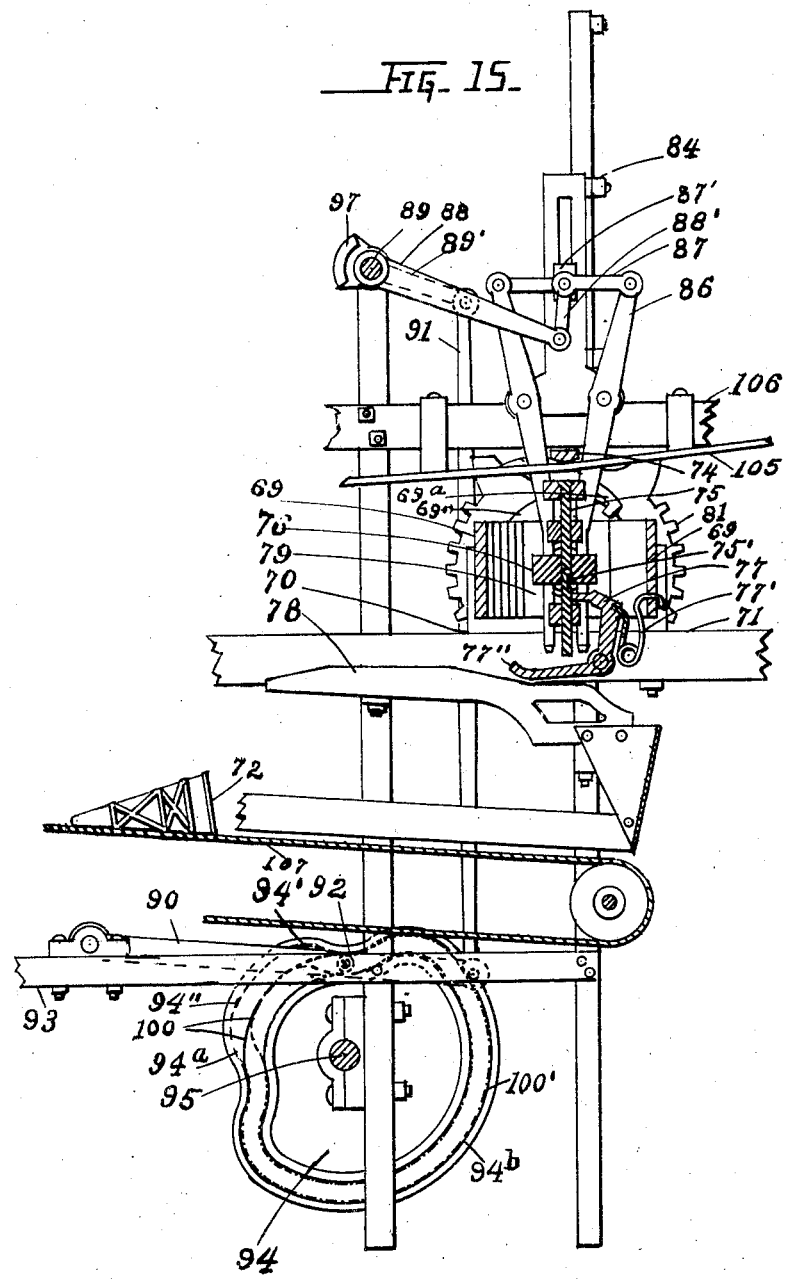

WEBSTER M. ROBERTS AND PARK D. ROBERTS, OF ST. JOSEPH, MISSOURI.

AUTOMATIC CONE-MAKING MACHINE.

1,392,284.  Specification of Letters Patent.  Patented Sept. 27, 1921.

Application filed August 11, 1916. Serial No. 114,395.

*To all whom it may concern:*

Be it known that we, WEBSTER M. ROBERTS and PARK D. ROBERTS, citizens of the United States, residing at St. Joseph, in the county of Buchanan and State of Missouri, have invented certain new and useful Improvements in Automatic Cone-Making Machines, of which the following is a specification, reference being had therein to the accompanying drawing.

This invention relates to an improved apparatus for forming and baking pastry products, having particular reference in the form of the invention herein illustrated and described to the molding and baking of ice cream cones.

The apparatus here shown is intended for quantity production or commercial manufacturing of ice cream cones or similar products, and is adapted for the realization of the following particular objects of the invention:

It is an object of the invention to arrange a series, indefinite as to number, of separable mold units, each unit having a plurality of mold cavities with cores coöperating therewith, on an endless chain or carrier, operable over sprocket wheels and adapted to move the mold units through the upper and lower courses of an endless path, and relative to burners or heaters arranged along the path, to effect the forming and baking of the pastry products in the molds.

To accomplish more thorough and uniform baking of the cones it is an object of the invention to provide means along the path through which the molds are moved to invert and revert the mold units successively at suitable intervals so that both the upper and lower surfaces thereof may be exposed at times to the direct action of the heating devices, the inverting and reverting of the molds being effected automatically in the normal operation of the endless carrier.

It is a further object of the invention to provide for a step-by-step movement of the carrier and the molds as they are moved along the endless path thereby and to so coördinate these movements that one mold unit will be in a position to be operated to discharge the baked articles therefrom.

Other and more general objects of the invention consist in providing in effect a fullautomatic machine from which maximum production and minimum wastage will be realized relative to the capacity of the machine; from which the product will be uniform in weight, or dimensions, and baking, which will be simple and substantial in construction and dependable and economical in operation.

We attain these objects by the mechanism illustrated in the accompanying drawing, in which:—

Figure 1 is a side view of the preferred form of the machine, certain parts being omitted and others broken away. Fig. 2 is a top plan of the machine, the top of the oven being broken away. Fig. 3 is a front view of a portion of the machine. Fig. 4 is a side elevation of the mold forwarding mechanism. Fig. 5 is an enlarged vertical section in detail, of the gear and the core bar locking mechanisms. Fig. 6 is a side elevation of a portion of the machine, showing the ninety degree gears in their various positions, in detail, and the core bar lifters in their disengaged position. Fig. 7 is an enlarged end view of the molds. Fig. 8 is a horizontal section of the mold sliding means, on the line X X, seen in Fig. 9. Fig. 9 is an enlarged face view of the mold sliding mechanism. Fig. 10 is a top plan of one of the various other forms in which the machine may be made, the same being of reduced proportions, and a certain portion of the machine being broken away. Fig. 11 is a horizontal section in detail of the mold rotating means seen in Fig. 10. Fig. 12 is an end view, in detail of the mold rotating mechanism. Fig. 13 is a transverse section in detail, cut vertically through the center of the mold operating mechanism, the central portion of the parts being broken away. Fig. 14 is a face view in detail, of the mold locking mechanism, certain parts being broken away. Fig. 15 is a transverse section of the mold operating mechanism, cut vertically through the center of the core bar guide.

In the preferred form of our invention, as seen in Figs. 1 to 9, inclusive; a pair of molds 1, have a plurality of mold cavities 1' formed in their adjacent faces. The ends of said molds are slidably mounted in mold heads 2, for permitting said molds to be moved from and against each other. Said heads are secured together by bars 3, forming a mold frame.

Since the head supporting means for both heads is alike, in construction and operation, but one of said supporting means is described.

Head 2 has a hub 2' formed therewith and a trunnion 2'' secured in said hub. Said trunnion is rotatably mounted in mold carrier 4, and extends therefrom through the apertured sprocket link 5, which is one of the links of an endless sprocket chain 5'. Said chain passes around vertical sprocket wheels 6 and 7, which are secured on their respective shafts 6' and 7', rotatably mounted at the opposite ends of the frame of the machine.

Referring to Figs. 6 and 2, mold head 2 has core bar lock 8 oscillatably mounted thereon. Said lock has slot 8' formed therethrough, for the reception of the end of core bar 9 and for locking said core bar in place, upon the hereinafter described oscillation of said lock; it being understood that this core bar lock 8 holds the core bar to keep the cores in the mold when the latter is in an inverted position, and also locks the core bar with the cores in the cavities when the mold is in an upright position, as when the larger ends of the cores are upward, until such time as the core bar lock is moved to the position shown in Fig. 6 when the core bar and its cores are to be elevated with respect to the mold, as shown in Figs. 1 and 6.

Since both molds of said pair are alike in construction and operation, but one is described. Mold cavity 1', (see Fig. 1,) has channels 1ª formed in the surface thereof; said channels being of ornate form and evenly distributed over said surface, for holding a cone 10 against longitudinal movement in said cavity, while the cone shaped core 11 is being raised, as hereinafter described. The molds thus secured to the chain are moved in an endless path leading over the sprocket wheels and through the upper and lower planes of travel of the chain.

Core 11 is connected with core bar 9, and is of such proportions, that normally, the space between the surfaces of said core and cavity 1' forms a suitable mold in which to form and bake said cone 10. When released from said molds, at position A, in Fig. 1, the cones fall therefrom down inclined chute 13, and thence onto endless carrier 14, of which only the lower end portion is shown.

The lower end of said carrier is mounted on the rotatably mounted drum 15, while its upper end terminates at any desired point where cones are to be delivered.

Referring to Figs. 7, 8 and 9, each pair of molds is provided with a stud 16', at the opposite ends thereof, a friction roll 16 being rotatably mounted on each of said studs.

Said rolls are situated in chanels 17', (see Fig. 9,) formed in the mold shifting cam 17, which latter is slidably mounted for vertical movement in mold head 2. The upper ends of said channels unite and form spring chambers 17'', in which is mounted the leaf spring 18. The free ends of said spring press said rolls toward each other, and yieldingly hold them in position, when said pair of molds is closed, as seen at position B, in Fig. 1. The lower end of cam 17 has bolt 19 connected therewith, which bolt has head 19' formed on its lower end.

The channeled head 20 is formed on the upper end of shifter rod 21, which is slidably mounted on carrier bar 22, which latter is provided with pivot stud 22'. which is oscillatably mounted on rail 23. Rock shaft 24 is crank connected with the lower end of rod 21 in the following manner: Said shaft has a toggle member 25 formed on each end thereof, (see Figs. 1 and 3,) the lower return bent end portion of said member being pivotally connected with the lower end of said shifter rod, while the upper end of said member is pivotally connected with the lower end of toggle member 26. the upper end of the latter member being pivotally connected with the upper end of carrier bar 22. Rock shaft 24 has crank 24' formed on the central portion thereof, the free end of which is connected with the slidably mounted cam 27, by connecting rod 28. The lower portion of said cam is formed of spring 27', which latter has inward projection 27'' formed on its lower end. Cam guides 29 have their right ends secured in cam 27, while their left end portions are slidably mounted through rod guides 30, which are loosely mounted on cam shaft 31. which is rotatably mounted on rails 23.

Arm 31' is secured on said cam shaft and has friction roll 31'' rotatably mounted on one side of the free end thereof, for operating cam 27, as hereinafter described.

Cam 32 is secured on the central portion of shaft 31 and has cam channels 32' and 32'', of lesser and greater radius, respectively, formed in one of its faces. Said channels are connected by channel portions 32ª and 32ᵇ, forming one continuous channel. Friction roll 33 projects into said continuous channel. Said friction roll is rotatably mounted on one side of one of the ends of lever 34, the central portion of which is provided with pivot 34'. which is oscillatably mounted in brackets 35, which are secured to transverse rail 36, the ends of said rail being secured on rails 23. The other end of lever 34 is rod connected with crank 37, by connecting rod 37'. Said crank is secured on the central portion of rock shaft 38, the ends of which are oscillatably mounted in brackets 39, which latter are secured on legs 40.

Since the following described parts are made in duplicate, but one set of said parts is described:

Crank 41 is secured on one end of rock shaft 38 and is connected with the upper end of carrier bar 22, by connecting rod 43; which described parts form bar oscillating means, whereby bar 22 is oscillated.

Rocker bar 22 has the bifurcated hub holder 44 secured on its upper end, the bifurcations of said holder being in engagement with hub 2', as seen in Fig. 1, for holding said hub against vertical movement, when the mold sliding means is operated, as hereinafter described.

The inclined lower core bar lifter 45 is formed with said hub holder, while the upper core bar lifter 46 is formed with and extends above said lower core bar lifter. The above described parts are used in duplicate at the opposite side of the machine.

Mold carrier 4 is provided with transporting wheels 47, which run on upper track rail 48 and lower track rail 48'. Said wheels are guided by curved rails 49 and 49', respectively, while the described sprocket chain and trunnion 2'' carry said mold carrier and the wheels connected therewith over the sprocket wheels 6 and 7, as seen in Fig. 1.

Mold head 2 is provided with an inverting gear 50 secured on hub 2', as seen in Fig. 5. Said gear is normally held against rotation by lock bolt 57, which has head 57' formed on its outer end. Said bolt is slidably mounted in the upper end of carrier 4, and is actuated by a spring 57'' to move into an aperture 50', (see Figs. 5 and 1,) formed through the diametrically opposite extended portions of said gear.

Said gear is carried into and through engagement with rack 51, for inverting head 2 and the thereby carried pair of molds 1.

Said rack may be secured on track rail 48, between positions C and D, as shown, or the same may be secured on said rail between any two other subsequent positions, as desired; thereby regulating the time of baking before the molds 1 are inverted. It will be understood that any number of said pairs of molds and the described parts connected therewith, including a gear 50 may be used between positions D and E. Gear 50 is carried into engagement with rack 52 for reverting the molds and the therewith connected parts. Rack 52 is secured on track rail 48 between positions E and F. Racks 51 and 52 respectively, as shown in Fig. 1, invert and revert said molds, the molds being carried in an inverted position, throughout the greater part of the length of the machine. While said parts are passing from position F to position H, around the sprocket wheel 6 they are carried around the left half of sprocket wheel 6 and thereby again inverted, and are thus carried to point K.

While said parts are carried from point H to point K, the molds pass directly over gas burners 53 inclosed in an oven or casing 53$^a$ through which the molds travel, thereby completing the baking of the pastry articles therein.

The opposite mold head 2 is similarly provided with the ninety degree gear 54, which, in passing from point K to point L, is carried into and through engagement with rack 55, whereby said opposite mold head and its connected parts are turned counter-clockwise, ninety degrees, from their described position, to the position seen at point L. While the last mentioned parts are passing from point L to point A, said parts are thereby still farther turned ninety degrees, counter-clockwise, thus reverting said parts, including molds 1, to the position seen at point A.

While gear 54 is passing from point A to point B the outer, slotted end thereof is carried into and through engagement with lug 56, (see Fig. 6,) thereby rotating it and its described parts, connected therewith, ninety degrees clockwise, thus placing said parts in their reverted, or upright position, as seen at point B. Said lug is secured on one of the rails 49'.

Previous to each of the previously described rotations of gears 50 and 54, the heads 57' of bolts 57 are carried into engagement with a pair of plates 58, the inclined portions 58' of which force said heads outward, thereby overcoming springs 57'', and moving the inner ends of said bolts from their engagements with their respective gears 50 and 54, thereby unlocking said gears. Said bolts are held in this position by said plates until said rotations are completed, after which said heads are carried past said plates, upon which the thus released bolt is returned to normal position by spring 57''.

Ninety degree gear 54 has aperture 54' formed therethrough which is similarly engaged by bolt 59, and is similarly disengaged by engagement of the head of said bolt with plates 60, which have inclined portions 60' formed thereon.

A plurality of batter nozzles 61, (see point B, Fig. 1,) direct batter into mold cavities 1', at point B, and since said batter nozzles and their operating mechanism form no part of this invention the same are neither fully shown nor fully described. Said nozzles are moved from the position shown, in Fig. 1, to the position seen in Fig. 6, by said nozzle operating mechanism for removing said nozzles from the path of travel of molds 1, while moving from point A to point B, as previously described.

Cam shaft 31 has pulley 62 secured one end thereof, as seen in Figs. 2 and 3. Said shaft has crank 63 secured on its opposite end, the free end of said crank being connected with pawl carrier 64, (see Fig. 4,) by connecting rod 64'. Said pawl carrier is oscillatably mounted on shaft 7' and carries pawl 65, which engages ratchet wheel 66, which latter is secured on shaft 7'.

In operation, with the parts in the position seen in Fig. 1, power is applied to pulley 62, (see Figs. 2 and 3,) which rotates cam shaft 31 clockwise, which similarly moves the free end of arm 31' and the thereon carried roll 31''. Said roll, (see Fig. 1,) is carried against projection 27'', which moves the latter and the therewith connected parts, (including the pivotal connection of toggle members 25 and 26,) toward the left as viewed in Fig. 1 of the drawings.

This toggle movement brings said toggle members in alinement and thereby forces rock shaft 24 and the therewith connected shifter rod 21 downward, which lowers slotted head 20 and the therewith engaged bolt head 19'. This movement draws bolt 19 and the therewith connected cam 17, (see Fig. 9,) downward, from the position of said bolt, shown at position A, in Fig. 1, to the position seen at position B, and also shown in Fig. 9. This downward movement of cam 17, drives rolls 16 inward, from the position indicated by dotted lines, into engagement with springs 18, as shown. This movement of said rolls moves molds 1 from their separated position seen at point A, in Fig. 1, to their closed position seen at point B.

During the time in which the previously described actions are taking place, cam channel portion 32' of cam 32, passes friction roll 33, after which channel portion 32ª drives said roll downward, which raises the right end of lever 34, which by its connected parts, moves the carrier bar 22 from the position seen in Fig. 1, to the position seen in Fig. 6.

This movement of parts removes lower and upper core bar lifters from beneath the ends of core bars 9 at positions A and B, upon which said core bars and their connected cores 11 gravitate to the position seen at point L.

Previous to the lowering of said core bars, a charge of batter is injected into each one of said cavities, at point B, (from an unshown source of batter supply,) through nozzles 61, after which, said nozzles are moved from the position seen in Fig. 1, to the position seen in Fig. 6.

After the previously described movements have taken place, and while channel portion 32'' is passing roll 33, said parts remain in the position seen in Fig. 6, and during this time, the previously described pawl and ratchet mechanism, seen in Fig. 4, rotates sprocket shaft 7', counter-clockwise one step, which similarly rotates sprocket wheel 7, which moves sprocket chains 5' and the therewith connected mold heads 2, which carry molds 1 from position A to position B, while the molds 1 which were at position B, are moved to position C, during which their core bar locks 8 are carried into contact with and past lugs 8'', which rotate said locks, from their unlocked position seen at points A and B, in Fig. 6, to their locked position, seen at point L, thereby holding core bar 9 in position, with cores 11 in said cavities 1'.

The previously described cone making unit is thereafter moved from point C to point D, (see Fig. 1,) and during said movement, is inverted by the previously described gear and rack mechanism. Said unit is thus carried to point E, and while passing therefrom, to point F, is reverted as previously described. Said unit is then carried around the outer half of sprocket wheel 6, and is thereby again inverted, after which the thus inverted unit is carried from point H to point K, over gas burners 53, by which said unit is heated for baking the therein contained batter.

It will be understood that a certain portion of the heat from said burners passes upward between the several cone making units, through oven 67, and out through smoke stack 67', thereby heating said unit while it is passing from point C to point H. From the foregoing it will also be understood, that residual heat in molds 1 and cores 11, partially bakes such portions of the previously mentioned batter, (while said unit is at point B,) as comes in contact therewith, and that the previously described inversion of said cone making unit, causes a certain portion of said batter to gravitate, into the lower, larger portion of mold cavity 1'. Due to the conversion by heat, into steam, of the water contained in said batter said batter is thereby expanded and fills said cavity completely, thus molding a perfectly formed cone 10.

While said cone making unit, with the thus perfectly formed and baked cone 10, therein, is passing from point K to point L, the same is rotated ninety degrees counter-clockwise, by the engagement of ninety degree gear 54 with rack 55.

While said unit is passing from point L to point A, one extremity of bar lock 8 is carried against and past lug 55', thereby moving said lock from the position seen at point L in Fig. 6, to the position seen at point A.

While said unit rests at point A, it will be seen by referring to Figs. 1 and 6, that the spaces both above and below said unit, are unobstructed, affording opportunity to operate such other mechanism as may be desired.

Opportunity is also afforded for operating the previously described mold shifting mechanism, and for the discharging of baked cones 10 from said unit, as hereinafter described.

Immediately after said cone making unit reaches point A, cam channel portion 32<sup>b</sup> passes friction roll 33, which moves said friction roll upward, which reversely oscillates lever 34 and all of the parts connected therewith, including shifter rod 21, from the position seen in Fig. 6 to the position seen in Fig. 1, bringing slotted head 20 into engagement with bolt head 19', and at the same time moving the inclined core bar lifters 45 and 46 beneath core bars 9, at positions A and B, respectively, thereby lifting said core bars.

While cam channel portion 32' is passing roll 33, said core bar lifters remain in the position seen in Fig. 1. During the first portion of this time, arm 31' carries roll 31" against the upper end of cam 27, and thereby moves said cam from the position seen in Fig. 6, to the position seen in Fig. 1.

This movement of cam 27, by the described parts, moves toggle members 25 and 26 from their alined position, seen in Fig. 6, to the position seen in Fig. 1, thereby raising rock shaft 24 and the therewith connected shifter bar 21, which latter carries slotted head 20 and the therewith engaged bolt head 19' upward. This movement of parts raises mold shifting cam 17, (see Fig. 9,) which reversely moves friction rolls 16' and the therewith connected pair of molds 1, bringing them to the position seen at point A in Fig. 1.

While the core bar at point A is lifted as seen at 9, core 11 is loosened from a cone 10, which latter is held against longitudinal movement, by channels 1', and when molds 1 are moved from each other, as previously described, said cone gravitates therefrom, onto chute 13, by which said cone is directed onto endless carrier 14, and is thereby carried to the previously described and distant desired point.

While the previously described movements are taking place, for shifting said molds 1, the bifurcated hub holder 44 holds hub 2' and its connected parts against vertical movement. During operation of the machine, all of the previously described operations are repeated, for serving each one of the several cone making units in the same manner.

Since it is evident that the mold members should be separated on a line, longitudinally through the centers of the mold cavities, in order to fully strip the same from the baked cones to be discharged therefrom; and further be combined with inverting and reverting means for the molds in order to evenly bake the cones, the prime element of our invention is a plurality of separable molds, separated on the line described, rotatably mounted on a movable carrier, regardless of the various forms in which the same can be made; we reserve the right to use other forms of movable mold carriers, and to so modify the forms of the molds as to adapt them to be used on said other forms of movable carriers.

One of such other forms of mold carriers and modified forms of molds are shown in Figs. 10 to 15, inclusive.

Referring to Figs. 11 and 13, each end of a pair of mold sections 68 is slidably mounted in a mold head 69. Said head has a hollow trunnion 69' formed therewith, which is rotatably mounted in a mold carrier 70, which latter is secured on the turn table 71, (see also Fig. 10,) which is mounted for rotation in a horizontal plane. Said turn table is forwarded through a step by step movement, for bringing said mold sections into position, consecutively, for emptying them of baked cones and for recharging them with batter, as hereinafter described; and since the table forwarding mechanism forms no part of this invention the same is neither shown nor described.

Trunnion 69' has latch disk 69" formed on its outer end, which disk has the two diametrically opposite notches 69<sup>b</sup> formed in its periphery, as seen in Fig. 14. Said notches are engaged (alternately, as hereinafter described,) by pawl 69<sup>a</sup>, for holding said disk and the therewith connected parts against rotation.

Molds 68 have mold cavities 68' formed therein, (see Fig. 13,) in the surfaces of which channels 68" are formed, and adapted to hold a cone 72 against longitudinal movement, when core 73 is lifted, as hereinafter described.

A plurality of cores 73 are secured on core bar 74, which has the upper end of core bar guide 75 secured in the end thereof. Said guide extends downward therefrom, between mold bars 76, which are formed on the ends of mold sections 68. Said guide has latch notch 75', (see Fig. 15,) formed in one side of the lower end portion thereof, said notch being adapted to be engaged by the upper end of latch 77, which is pivotally mounted in mold head 69 and is actuated by spring 77' to move into said engagement. Said latch has latch lever 77" formed therewith, the free end of which is carried over inclined plate 78, for unlatching said latch engagement.

Mold bars 76 are detachably held against each other, by socket piece 79, which is slidably mounted in trunnion 69', said socket being actuated by spring 80 to move against and engage the ends of said bars.

Gear 81 is secured on the outer end of trunnion 69′, against latch disk 69 and closes the outer end of said trunnion.

Referring to Fig. 13, pawl 69ª is secured on pawl shaft 82, which is oscillatably mounted in upwardly extended portions of mold carrier 70. Said shaft is actuated by spring 82′ to oscillate for moving the lower end of said pawl into its engagement with latch disk 69″, as seen in Fig. 14.

Socket piece 79 has stem 79′ formed therewith, the outer end of which extends through gear 81, (see Figs. 11 and 13,) and has stem head 79″ secured on its outer end. The adjacent surfaces of gear 81 and said stem head are adapted to have a wedge inserted between them.

Wedge bar 83 is secured on frame 84, which is slidably mounted for vertical movement. The lower end of said bar is wedge shaped and is forced between said adjacent surfaces, for outwardly moving said head and the therewith connected socket piece 79, for moving said socket piece from the position seen in Fig. 11, to the position seen in Fig. 13, for releasing the previously described engagement of said socket piece with mold bars 76.

Said mold bars have apertures 85, (see Fig. 11,) formed therethrough, through which the lower end portion of the mold shifting tongs 86 are passed. Said tongs are pivotally mounted on frame 84, and are operated by toggle members 87, (see Fig. 15,) the inner ends of which are connected with guide block 87′, which is slidably guided for vertical movement in said frame. Said block is rod connected with the free end of arm 88, by connecting rod 88′. Arm 88 is secured on rock shaft 89, which has crank 89′ secured on one end thereof, as more clearly shown in Fig. 10. Crank 89′ is rod connected with one end of lever 90, by connecting rod 91. Said lever has friction roll 92, rotatably mounted on its intermediate portion, while its opposite end is oscillatably mounted on frame rail 93. Said roll projects into cam channel portion 94′, formed in the outer face of cam 94, which is secured on the rotatably mounted cam shaft 95. Said face of said cam also has channel portions 94″, 94ª, and 94ᵇ formed therein.

Referring to Fig. 10, frame 84 is moved vertically, by arm 96, the free end of which is link connected with said frame by link 96′, as seen in Fig. 13. Arm 96 is secured on one end portion of rock shaft 97, (see Figs. 10 and 15,) which is oscillatably mounted on rock shaft 89. Rock shaft 97 has arm 97′ formed on one end thereof, the outer end of which is rod connected with lever 98, by connecting rod 98′. The opposite end of said lever is oscillatably mounted on frame rail 93, while friction roll 99 is rotatably mounted on its intermediate portion. Said roll projects into cam channel portion 100, which is formed in the inner surface of cam 94.

Channel portion 100′ is also formed in the inner face of said cam, and unites with channel portion 100, forming one continuous channel.

Gear 81 is adapted to engage racks 101 and 102, (see Figs. 10 and 12,) for inverting and reverting the previously described mold sections 68. Said racks are secured on any desired portion of the frame of the machine.

Referring to Figs. 10 and 14, plates 101′ and 102′ are similarly mounted at such points as immediately precede racks 101 and 102, respectively, for depressing the upper end of pawl 69ª, and thereby unlatching said pawl.

Gas burners 103 are mounted beneath the greater number of molds 68, for heating the same. Batter nozzles 104 form a part of a batter filling mechanism whereby said molds are charged with batter, and since said mechanism forms no part of this invention, the same is neither fully shown nor described.

Inclined rails 105 are secured on frame rails 106 and are adapted to raise the ends of core bar 74, when the same are moved thereover, while the right end portions of said rails, incline downward and are adapted to permit said core bar to gravitate, while being passed thereover.

Endless carrier 107, (see Fig. 15,) of which but the lower end portion is shown, is adapted to carry baked cones 72, from the machine, to a desired distant point.

In operation, with the parts in the position shown in Figs. 10, 13, and 15, power is applied to cam shaft 95, by any well known power conveying means, not shown, for rotating said shaft clockwise. It will be seen that the ends of core bar 74 have been carried over a portion of the upwardly inclined rails 105, thereby slightly lifting said core bar, and loosening the thereby carried core 73 from the inner surface of the baked cone 72.

Clockwise rotation of shaft 95 rotates cam 94, which carries channel portion 94′ past roll 92, thereby raising said roll, and the therewith connected parts, including the inner ends of toggle members 87. Said members move the upper ends of tongs 86 toward each other. This moves the lower ends of said tongs outward, thereby similarly moving the mold bars 76 and the therewith formed molds 68. It will be seen and understood that the greater portion of core 73 projects into the baked cone 72, while the molds 68 are thus being moved from each other, and that said core acts as cone holding means, whereby the baked cone is practically held against lateral movement, during this operation, causing said cone to be stripped from the surfaces of mold cavities 68'. At this juncture the thus released cone 72 gravitates onto endless carrier 107, by which it is carried to the previously mentioned distant point.

While cam channel portion 94'' is passing roll 92, the parts are thereby held in their described position, for giving said baked cone time in which to gravitate.

During the time in which cam channel portion 94ª passes roll 92, said channel portion drives said roll downward, thereby reversing the hereinbefore described movement of tongs 86, moving molds 68 against each other, to the position shown.

During the time in which the previously described movements take place, cam channel portion 100 passes roll 99, thereby holding lever 98, and its connected parts, including frame 84, in the position shown. From this point to the farther ends of cam channels 94ᵇ and 100', said channels are of the same contour and size, and these channel portions, first, synchronously drive their respective rolls 92 and 99, upward, and thereby synchronously raise slide block 87' and frame 84, respectively, together with all of their connected parts, including tongs 86, and thereafter hold said parts in their raised position.

While said parts are held in their raised position, the turntable 71 is forwarded one step, clockwise, which brings the succeeding set of molds 68, into position for being served, as previously described.

After this, the first part of channel portion 94' passes roll 92, and during the same time the first part of channel portion 100 passes roll 99, thereby driving said rolls downward, which by their connected parts, synchronously lower frame 84 and slide block 87', to the position shown, after which all of the operations are repeated.

At the end of said step of the movement of turn table 71, the thus emptied set of molds 68 are stopped beneath batter nozzles 104, said nozzles having been previously raised. Said nozzles are then lowered and a charge of batter is injected therethrough, into mold cavity 68', after which said nozzles are again raised. During the next step of said movement, the core bar 74, of the thus filled molds gravitates as its ends pass over the downwardly inclined end portions of plates 105, until said core is fully lowered, with the therewith connected core 73 in mold cavity 68'.

During the next step of said movement, gear 81 is carried into and through engagement with rack 101, thereby inverting said set of molds and their connected parts.

When said core bar is fully lowered, as previously described, its guide 75 is thereby lowered, bringing guide notch 75' into register with the upper end of latch 77, after which spring 77' moves said latch end into said notch, thereby locking said core bar in its lowered position.

Immediately previous to the previously described inversion of said set of molds, the upper end of pawl 69ª, (see Fig. 14,) is carried beneath plate 101' and is thereby depressed, overcoming spring 82', (see Fig. 13,) and unlatching said pawl from latch disk 69''.

After said set of molds is inverted, as previously described, it is carried, step by step, and at the end of each step, stops for the described period of time, over a gas burner 103, thereby heating said set of molds, and baking the therein contained batter. When said molds 68 reach plate 102' the previously described mold latching mechanism is thereby unlatched.

Gear 81 is thereafter carried into and through engagement with rack 102, thereby reverting said molds. At the end of the next step, said molds are carried into position for again being emptied of baked cones, as previously described, and all of the plurality of sets of molds, carried by turn table 71 are similarly served.

Having fully described our invention, what we claim as new and desire to secure by Letters Patent is:—

1. In a machine of the character described; a mold carrier mounted for movement through a given path; a plurality of mold sections having mold cavities formed in their adjacent faces said sections being separable on a line extended longitudinally through the centers of said cavities; male mold members adapted to be inserted into said cavities; and mold mounting means whereby said mold sections are rotatably mounted on said carrier.

2. In a cone making machine, a mold carrier mounted for movement through a given path; a pair of mold sections having a mold cavity formed in each one of the adjacent faces of said sections said sections being separable on a line extended longitudinally through the center of the cavity thus formed therebetween; a core adapted to be inserted into and removed from said cavity for forming a mold in said cavity said mold being adapted to have a cone molded and baked therein; core securing means whereby said core is detachably secured in said cavity; mold mounting means whereby said mold sections are rotatably mounted on said carrier; and mold shifting means whereby said mold sections are moved from each other for permitting a baked cone to gravitate from therebetween and thereafter are moved against each other.

3. In a machine of the character described; a mold carrier mounted for movement through a given path; a pair of mold sections having a plurality of mold cavities formed in their adjacent surfaces said sections being separable on a line extended through the centers of said cavities longitudinally thereof; a core bar; a plurality of cores secured on said core bar said cores being adapted to be inserted in said cavities, respectively for forming a plurality of molds in said cavities around said cores; core bar securing means whereby said core bar is detachably secured in place with said cores in said cavities respectively; and mold mounting means whereby said mold sections are rotatably mounted on said carrier.

4. In a machine of the character described; a mold carrier mounted for movement through a given path; a pair of mold sections having a plurality of mold cavities formed in their adjacent surfaces said sections being separable on a line extended longitudinally through the centers of said cavities; a core bar; a like plurality of cores secured on said core bar said cores being inserted in said cavities respectively, forming a plurality of molds; core bar securing means whereby said core bar is detachably secured in place with said cores in said cavities; mold mounting means whereby said mold sections are rotatably mounted on said carrier; and mold rotating means whereby said mold sections and the thereby carried core bar and cores are rotated for inverting and reverting the same.

5. In a machine of the character described, a cone making unit comprising a pair of separable mold sections each one of which has a plurality of mold cavities formed in their adjacent surfaces said sections being separable on a line extended longitudinally through the centers of said cavities; a core bar; a plurality of cores secured to said core bar said cores being adapted to be inserted in said cavities for forming a plurality of molds around said cores; core bar securing means whereby said core bar is detachably secured in place with said cores in said cavities respectively; mold mounting means whereby said mold sections are adapted to be rotatably mounted on a carrier and gear members connected with said mold mounting means; an endless movable mold carrier; carrier moving means whereby said carrier is moved through a given path; a plurality of gas burners placed beneath said path; a plurality of said cone molding units rotatably mounted on said carrier; a plurality of gear member engaging means secured to fixed parts of said machine at predetermined points along said path for engaging and rotating said gear members and thereby inverting and reverting said cone molding units.

6. In a cone making machine; a mold carrier mounted for movement through a given path; a pair of separable female mold sections rotatably mounted on said carrier said sections having mold cavities formed in their adjacent faces and being separable on a line extended longitudinally through the centers of said cavities; cores in said cavities forming molds therein around said cores; core holding means whereby said cores are detachably held in said cavities; mold rotating means whereby said mold sections and the therein carried cores are rotated for inverting and reverting the same; mold shifters for said mold sections; and shifter operating means whereby said shifters are operated for moving said mold sections from and against each other.

7. In a cone making machine; a mold carrier mounted for movement through a given path; a pair of mold sections rotatably mounted on said carrier said mold sections having a plurality of mold cavities formed in their adjacent faces and being separable on a line extended longitudinally through the centers of said cavities; a core bar; a plurality of cores secured on said core bar said cores being in said cavities respectively; core bar locking means whereby both ends of said core bar are normally locked in place; core bar releasing means whereby said core bar locking means are released; core bar raising and lowering means whereby both ends of said core bar are raised and lowered while said locking means are released; and lock moving means whereby said locking means are moved for locking said core bar in place after it has been lowered.

8. In a cone making machine; a mold carrier mounted for movement through a given path; a pair of separable mold sections having a plurality of cone shaped cavities formed in their adjacent faces said sections being separable on a line extended longitudinally through the centers of said cavities; mold mounting means whereby said mold sections are rotatably mounted on said carrier; mold holding means mounted on said mounting means and carrier whereby said mold sections are normally held against rotation; mold releasing means whereby said mold holding means is released; mold rotating means whereby said mold sections are rotated for inverting and reverting the same; and returning means whereby said mold holding means is returned to normal position after said mold sections are rotated.

9. In a cone making machine, a pair of separable female mold sections having a plurality of mold cavities formed in their means to raise the core in each mold to release the baked product from the core, and means to remove said product from the mold.

16. In a machine of the character described, the combination, with an endless carrier, a plurality of mold units secured thereto and adapted to be moved step by step through a fixed path thereon, said mold units comprising a sectional mold and a corresponding forming core therefor, means to supply batter to said molds, means to heat the mold units to bake the product therein, means to supply batter to said molds, means to heat the mold units to bake the product therein, and a common actuator whereby the forming core of one mold unit may be raised to permit batter to be supplied to the mold of said unit, and the forming core of another mold unit may be raised between succeeding steps to permit the baked product to be removed therefrom.

17. In a machine of the character described, the combination, with an endless carrier, a plurality of mold units secured thereto and adapted to be moved step by step through a fixed path thereon, said mold units comprising a sectional mold and a corresponding forming core therefor, means to supply batter to said molds, means to heat the mold units to bake the product therein, and means whereby the forming core of one mold unit may be raised to permit batter to be supplied to the mold of said unit, and the forming core of another unit may be raised simultaneously to permit the baked product to be removed therefrom.

18. In a machine of the character described, an endless carrier, a plurality of mold units secured thereto and adapted to be moved step by step through a fixed path thereby, said mold units comprising a sectional mold having a plurality of mold cavities therein and a corresponding plurality of forming cores, means to supply batter to said molds, means to heat the mold units to bake the product therein, means to successively lock the mold units against forward travel thereof, and means whereby during the intervals of said locked relations the forming core of one mold unit may be raised to permit batter to be supplied to the mold of said unit and the forming core of another unit may be raised to permit the baked product to be removed therefrom.

19. In a machine of the character described, the combination, of a mold carrier consisting of endless chains operable over sprocket wheels mounted in the opposite ends of said machine, and heating devices arranged relative to said chains, with a plurality of mold units comprising cores, and mold sections separable on the longitudinal center line of the mold cavities therein, said mold units being rotatably mounted relative to said carrier and adapted to be moved with the travel thereof, and means intermediate said sprocket wheels to invert and revert the mold units relative to said heating devices.

20. In a machine of the character described, the combination, of a mold carrier consisting of endless chains operable along tracks extending between the opposite ends of said machine, and heating devices arranged relative to said chains, with a plurality of mold units comprising cores, and mold sections separable on the longitudinal center line of the mold cavities therein, said mold units being rotatably mounted relative to said carrier and adapted to be moved with the travel thereof, and means along said tracks to invert and revert the mold units relative to said heating devices.

21. In a machine of the character described, the combination, of a mold carrier consisting of endless chains operable over sprocket wheels mounted in the opposite ends of said machine, and heating devices arranged relative to said chains, with a plurality of mold units comprising cores, and mold sections separable on the longitudinal center line of the mold cavities therein, said mold units being rotatably mounted relative to said carrier and adapted to be moved with the travel thereof, and means along the upper and lower planes of travel of said carrier to invert and revert the mold units relative to said heating devices.

22. In a machine of the character described, the combination, of a mold carrier consisting of endless chains operable along tracks extending between the opposite ends of said machine, and heating devices arranged relative to said chains, with a plurality of mold units comprising cores, and mold sections separable on the longitudinal center line of the mold cavities therein, said mold units being rotatably mounted relative to said carrier and adapted to be moved with the travel thereof, and means fixed relative to said tracks adapted to coöperate with means carried by the mold units to invert and revert said units relative to said heating devices.

23. In a machine of the character described, the combination, of an endless mold carrier operable in an upper and lower plane, heating devices arranged below the upper plane of travel, with a plurality of mold units comprising cores, and mold sections separable on the longitudinal center line of the mold cavities therein, said mold units being rotatably mounted relative to said carrier and adapted to be moved with the travel thereof, and means arranged along the upper plane of travel of said carrier and coöperating with means carried by said mold units to invert the same relative to said heating devices.

24. In a machine of the character deadjacent surfaces, said mold sections being separable on a line extending longitudinally through the centers of said cavities; mold heads in which the ends of said mold sections are slidably mounted; a trunnion formed on the outer surface of each one of said mold heads; mold moving means for moving said mold sections from and against each other; a core bar; a like plurality of cores secured on said core bar said cores being respectively inserted in said cavities for forming a plurality of molds around said cores; and operating means for operating said mold sections and core bar; the whole forming a cone making unit; a movably mounted endless mold carrier; a plurality of said cone making units; said trunnions rotatably mounted in said mold carrier; and carrier moving means whereby said mold carrier is moved.

10. In a machine of the character described, a pair of rotatably mounted sprocket wheels; pawl and ratchet moving means whereby said sprocket wheels are rotated through a step by step movement; another pair of sprocket wheels rotatably mounted at a predetermined distance from the first mentioned wheels; an endless carrier formed of two endless sprocket chains mounted on said sprocket wheels; a pair of separable female mold sections having mold cavities formed in their adjacent faces; male mold members detachably secured in said cavities; mold mounting means wherein the ends of said mold sections are mounted for movement from and against each other, said mold mounting means being mounted for rotative movement in said carrier; mold rotating means whereby said mold mounting means are rotated for inverting and reverting said mold sections and the therein secured male mold members; and mold section shifting means whereby said mold sections are moved from and against each other at a point that is on the level with and adjacent to the central portion of the outer part of the peripheries of the first mentioned pair of sprocket wheels.

11. In a machine of the character described; a pair of rotatably mounted sprocket wheels; rotating means whereby said sprocket wheels are rotated through a step by step movement; another pair of sprocket wheels rotatably mounted at a predetermined distance from the first mentioned wheels; an endless carrier formed of two endless sprocket chains mounted on said sprocket wheels; a pair of mold sections having cone shaped mold cavities formed in their adjacent faces, said sections being separable on a line extended longitudinally through the centers of said cavities; a core bar; a plurality of cone shaped cores secured on said core bar and extending therefrom into said mold cavities; core bar holding means whereby said core bar is detachably held in position for holding said cores in said cavities respectively; said mold sections, said core bar, said cores and said core bar holding means forming a core molding unit; unit mounting means whereby said molding unit is mounted on said endless carrier; and mold shifting means whereby said mold sections are moved from each other at a point that is on the level with and adjacent to the central portion of the outer part of the peripheries of the first mentioned pair of sprocket wheels for permitting baked cones to gravitate from between said mold sections.

12. In a machine of the character described; a movable mold carrier; a plurality of mold sections having mold cavities formed in their adjacent faces said sections being separable on a line extended longitudinally through the centers of said mold cavities; and mold mounting means whereby said mold sections are rotatably mounted on said mold carrier.

13. In a machine of the character described, the combination, with an endless carrier, a plurality of mold units secured thereto and adapted to be moved through a fixed path thereby, said mold units comprising a sectional mold having a plurality of mold cavities therein and a corresponding plurality of forming cores, means to raise the cores in the mold cavities to permit batter to be supplied thereto, means along said path to invert and revert the mold units, respectively, and means to heat the same to bake the product therein, means to raise the cores in the molds to release the baked product from the cores, and means to open the molds to remove said product therefrom.

14. In a machine of the character described, the combination, with an endless chainlike carrier, a plurality of mold units secured thereto and adapted to be moved through a fixed path thereby, said mold units comprising a sectional mold having a plurality of mold cavities therein and a corresponding plurality of forming cores, means to raise the cores in the mold cavities to permit batter to be supplied thereto, means to heat the mold units to bake the product therein, means to raise the cores in the molds to release the baked product from the cores, and means to remove the said product from the molds.

15. In a machine of the character described, the combination with an endless carrier, a plurality of mold units secured thereto and adapted to be moved step by step through a fixed path thereon, said mold units comprising a sectional mold and a corresponding forming core therefor, means to raise the forming core in the mold to permit batter to be supplied thereto during the interval between two steps, means to heat the mold units to bake the product therein, scribed, the combination, of an endless mold carrier operable in an upper and lower plane, heating devices arranged below the upper plane of travel, with a plurality of mold units comprising cores, and mold sections separable on the longitudinal center line of the mold cavities therein, said mold units being rotatably mounted relative to said carrier and adapted to be moved with the travel thereof, means arranged along the upper plane of travel of said carrier and coöperating with means carried by said mold units to invert the same relative to said heating devices, and means to revert the mold units as they are moved from the upper to the lower plane of travel of said carrier.

25. In a machine of the character described, the combination, of a mold carrier consisting of endless chains operable over sprocket wheels mounted in the opposite ends of said machine, and heating devices arranged relative to said chains, with a plurality of mold units comprising cores, and mold sections separable on the longitudinal center line of the mold cavities therein, said mold units being adapted to be moved over said sprocket wheels with the travel of the carrier, means coöperating with the endless carrier at one end of said machine to operate one mold unit to charge the same with batter, and other means coöperating with said carrier to operate another mold unit to discharge the product therefrom.

26. In a machine of the character described, the combination, of a mold carrier consisting of endless chains operable over sprocket wheels mounted in the opposite ends of said machine, and heating devices arranged relative to said chains, with a plurality of mold units comprising cores, and mold sections separable on the longitudinal center line of the mold cavities therein, said mold units being adapted to be moved over said sprocket wheels with the travel of the carrier, means coöperating with the endless carrier at one end of said machine to operate one mold unit to charge the same with batter, and other means coöperating with the carrier simultaneously with the mold charging means to operate another mold unit to discharge the product therefrom.

27. In a machine of the character described, a main frame, an endless chain-like carrier mounted therein on drums spaced apart, a plurality of separable mold sections operated by said carrier and having cavities in their adjacent faces, cores therefor, and means for holding said cores in said molds when said molds are in inverted position.

28. In a machine of the character described, a main frame, an endless chain-like carrier mounted therein on drums spaced apart, a plurality of separable mold sections carried thereby, each mold comprising two separable members having cavities in their adjacent faces, means to open and close the two members of each mold, a core bar and a set of cores for each mold, means to raise the core bar and its cores to permit the insertion of batter in said cavities, means to detachably hold the cores in said mold when the mold is in inverted position, and means to bake the product in the mold.

29. In a machine of the character described, a main frame, an endless chain-like carrier mounted therein on drums spaced apart, a plurality of separable mold sections carried by said carrier, each having cavities in their adjacent faces, said sections and cores adapted to travel over said drums, said sections and cores inverting at times and reverting at other times, and positive mechanical core-supporting means for holding said cores in said molds when said mold sections are in an inverted position.

30. In a machine of the character described, the combination, with a mold carrier consisting of endless chains, supporting wheels therefor at opposite ends of the machine, separable molds carried by said carrier, a core bar and cores secured to the bar for each mold, means to bring and maintain each core bar and its cores into proper relation with respect to its mold, and means to open and close the mold halves of each mold.

31. In a machine of the character described, the combination, of a mold carrier consisting of endless chains, supporting wheels therefor mounted in opposite ends of the machine, separable molds carried by said carrier, a core bar and cores secured to the bar for each mold, and a heating oven through which the molds are adapted to travel to bake the product.

32. In a machine of the character described, the combination, with a mold carrier comprising endless chains, sprocket wheels at the opposite ends of the machine over which the chains pass, a heating oven through which the chains also pass, separable molds carried by said chains, means for opening and closing said molds, cores for each mold, means for securing the cores in the molds at times and for releasing them at other times, means for supplying batter to the molds at a predetermined place, and means for causing the molds and cores to permit the discharge of the cones at a predetermined place.

33. In a machine of the character described, the combination, with a mold comprising separable halves, of opening and closing devices comprising slidable means having cam surfaces adapted to engage the mold halves to open and close them.

34. In a machine of the character described, the combination, with separable molds each comprised of two members, of means for holding the mold halves closed and for opening them comprising slidable plates having surfaces adapted to coact with the mold halves, whereby when the plates are in one position the halves are held together and when adjusted to another position the halves are separated.

In testimony whereof we affix our signatures in the presence of a witness.

WEBSTER M. ROBERTS,
PARK D. ROBERTS.

Witness:
JOHN J. HINTON.